Nov. 12, 1929.                D. JONES                1,735,319
                BEARING FOR ROLLING MILLS AND THE LIKE
                    Filed Jan. 28, 1928          2 Sheets-Sheet 2
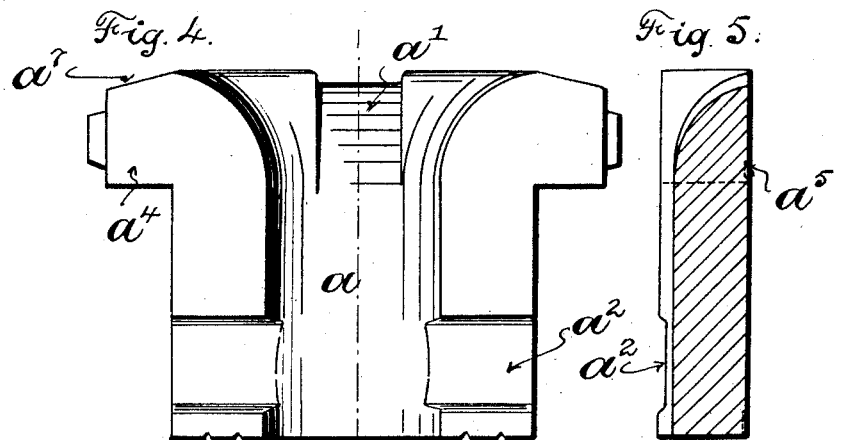
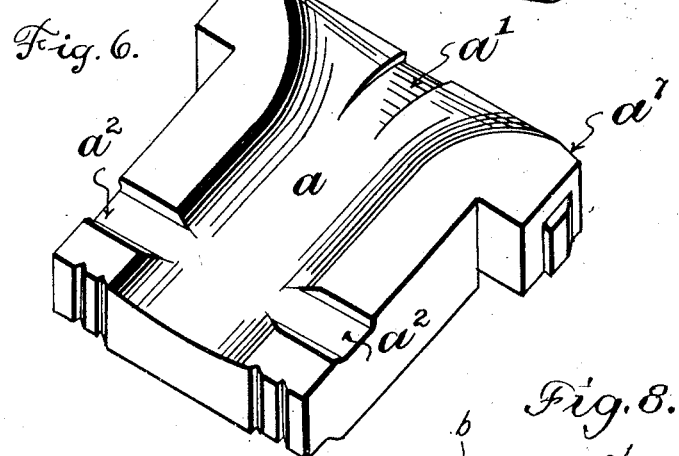
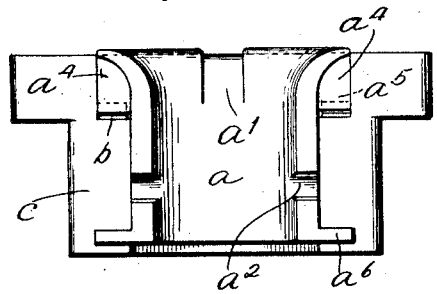
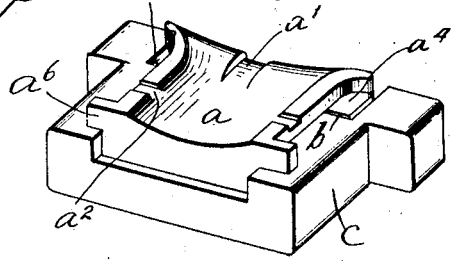
INVENTOR:
David Jones
BY: Rugg, Bayu & Batchelor
ATTORNEYS.

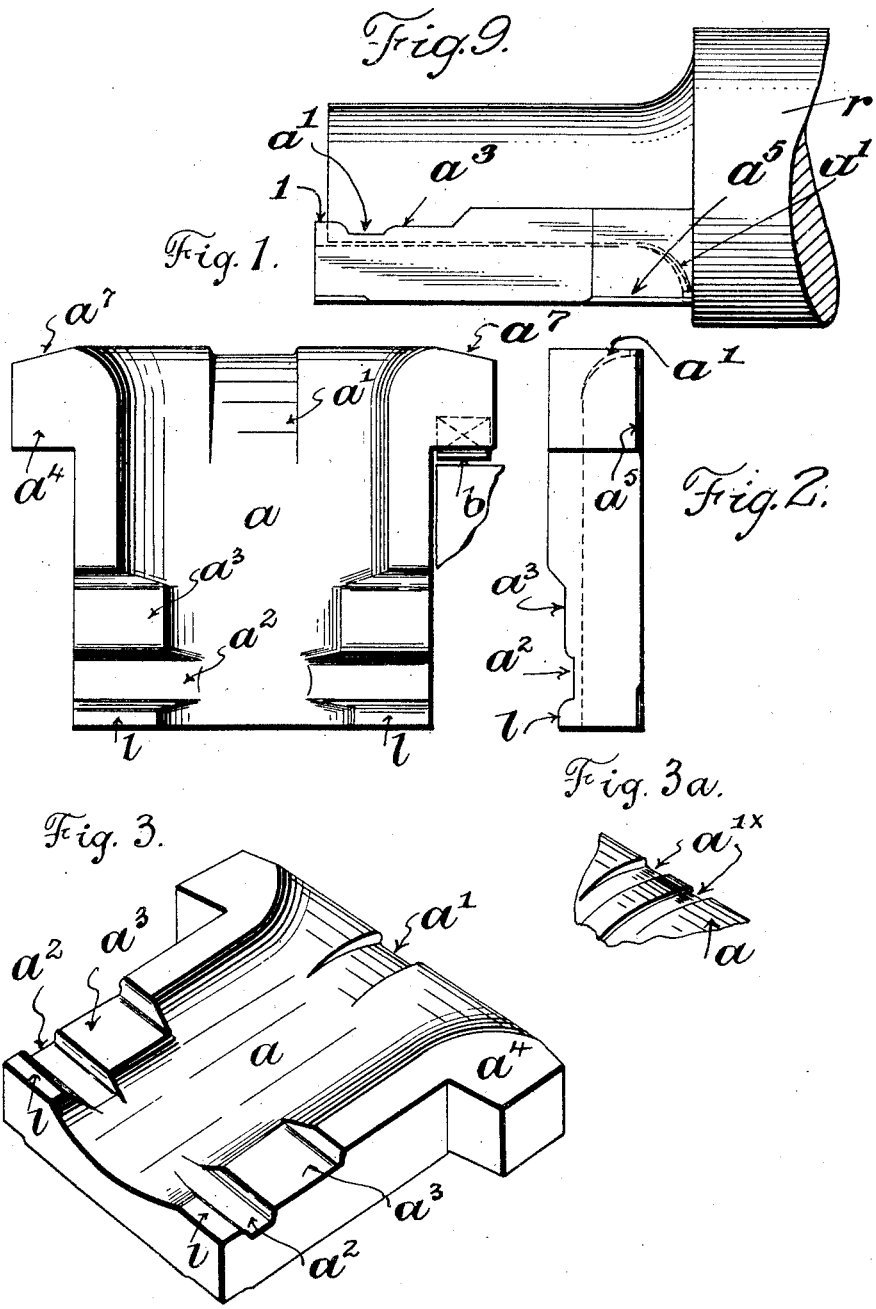

Patented Nov. 12, 1929

1,735,319

UNITED STATES PATENT OFFICE

DAVID JONES, OF GORPHWIPFA, TIRESED, GLANAMMAN, WALES

BEARING FOR ROLLING MILLS AND THE LIKE

Application filed January 28, 1928, Serial No. 250,261, and in Great Britain January 29, 1927.

These improvements relate to bearings for rolling mills for rolling or otherwise treating metallic sheets, or for use in like apparatus, and concern the type of bearing block which is more or less solid and receives the heavy axle ends of rollers used in the sheet metal and like industries.

I use a solid lower bearing block which is machined or cast on one face to curve over a portion of said face and which is rounded on the same face at the forward end where the inner neck or axle of the roll bears. This solid bearing block has solid ears or lugs one at each forward side to keep the bearing in place.

According to my present improvements I provide grooves on the contact face, one or more of such grooves longitudinally at the forward end and one or more grooves laterally towards the rear. In bearing blocks with the provided grooves I find it desirable to provide lugs or projections which act as abutments to hold the bearings in place and also corner fences in another portion to limit the movement of grease or lubricant as will be later explained.

The attached drawings illustrate the improved bearing blocks in several forms.

Fig. 1 is a plan view of a lower bearing block with one longitudinal groove and two lateral grooves or spaces on each hand, one lateral groove at higher level than the other.

Fig. 2 shows a side elevation.

Fig. 3 is a perspective view of the bearing block.

Fig. 3ª is a modification of the same.

Fig. 4 shows in plan view another form of lower bearing block with one groove in the direction of the length of the bearing block and a single lateral groove on each hand.

Fig. 5 is a section of Fig. 4, and

Fig. 5ª is a separate detail.

Fig. 6 is a perspective view of the bearing block Fig. 4.

Fig. 7 shows a plan view of a slightly modified form of the improved lower bearing block on its support, the bearing block having a longitudinal groove and a lateral groove on each hand. The figure also shows fences at each rear corner to check grease or lubricant travelling backwards.

Fig. 8 is a perspective view of the bearing block Fig. 7.

Fig. 9 is a plan view showing the block and roller in assembled position.

In the bearing blocks Figs. 1 to 6 I produce such blocks by casting or forging or otherwise and to substantially the shape or pattern illustrated, the blocks being lettered $a$. I cast, press, shape or cut a longitudinal groove $a'$ on the forward downwardly curved face, the groove extending from where the upper horizontal bearing level finishes and in a forward direction down to the bottom front edge (see Fig. 3). This groove is almost 2¾ inches wide or more or less, and slants from a shallow depth or nothing and runs downward to the bottom edge where it may be ½ inch deep or more or less. It forms a pocket for the grease or lubricant present in that locality. More than one such groove may be used this being indicated at Fig. 3ª where the grooves are marked $a'^x$.

Towards the rear of the bearing block $a$ and from the curved upper face to the side edges, I provide lateral grooves on each side. One wide groove $a^2$ at each side may be used as in Figs. 4, 5 and 6, or two grooves $a^2$, $a^3$ as shown in Figs. 1 to 3, where groove $a^2$ is at a lower level or deeper than the groove $a^3$. More than two lateral grooves may be used. Each bearing block Figs. 3 and 6 has the solid lugs $a^4$ to engage the structure of the bearing supports. In order to prevent the bearing block $a$ moving end on and to variously adjust the blocks to the necks of rolls, I may cut a recess $a^5$ right and left at the base of the solid projections $a^4$. Such recesses $a^5$ can sit on or engage the known angle-iron short spacers $b$ known as "baits" in South Wales.

These "baits" $b$ are of varying size and thickness and the vertical members can bear against any abutment. Their use allows for setting-up or back the bearing block $a$, because if the vertical member of the base $b$ is thicker or thinner, the solid projections $a^4$ are correspondingly nearer or farther from the neck. The recesses $a^5$ engage the "baits" on the known supports for the bearing blocks. Such "baits" are shown in position in Figs. 1, 7 and 8, and one of them separately by Fig. 5ª.

The Figs. 7 and 8 show one of my improved bearing blocks on a support or rest $c$ and also the use of "baits" $b$ the bearing block having the longitudinal grove $a'$ and the lateral grooves $a^2$. Also, in this case, to prevent the grease or lubricant travelling backwards too readily from the provided lateral grooves, I there show the rear or back of the block with projections $a^6$ at each rear corner, each projection extending upwards and outwards from the block $a$ a distance of about one inch in both directions, such projections forming corner fences which serve to confine or throw back the grease. Also I may as shown at Figs. 1 to 3, provide ridges or projections $l$ at the rear corners of the block which ridges form a rear fence.

I may, as shown in Figs. 1 and 4 cut away the forward corners of the bearing blocks at $a^7$ to allow any grease working along, to drop clear and prevent same reaching the sheet being rolled.

The longitudinal groove or grooves ensures perfect lubrication at the neck, and the lateral grooves form pockets and arresters for the grease so that the grease ponds up in the locality of the neck and laterally on each side of the block to feed the extended turned face of the shaft axle or trunnion. The ridges $l$ (Figs. 1, 2 and 3) or the projections or corner fences $a^6$ (Figs. 7 and 8) are or may be used along with the grooves in the several different types of bearing block and according to requirements.

Chocks, metal tongues or packing pieces may be fitted to or combined with the improved bearing block and any requisite engaging grooves or projections.

I declare that what I claim is:

1. Bearing blocks for sheet metal rolling or sheet metal treating mills comprising a solid lower block, a curved upper face to the block, lugs forward of the block on either hand, longitudinal groove provision at the forward end of the block, and lateral grooves communicating from the lateral edges of the block with the curved upper face of the block, and a rounded face at the forward edge of the block for the neck of the roll and a substantially flat base to the bearing block.

2. A bearing block for sheet metal rolling or sheet metal treating mills consisting of a solid lower block, a curved upper face thereto, longitudinal groove provision over the forward lengths of the block, and lateral grooves which meet the curved upper face from each lateral edge, and with lugs at the forward end of the block, and with a ridge at the rear of the block on each hand to prevent lubricant passing backwards.

3. A bearing block for sheet metal rolling or sheet metal treating machines consisting of a solid block with forward side lugs, a splayed curved upper face to the block for the neck, longitudinal groove provision at the end of the bearing near to the actual neck, short lateral grooves on either hand, and fitting faces on the solid block and rear fences at the back edge of the block as set forth.

4. A bearing block for sheet metal rolling or sheet metal treating machines consisting of a solid metal block, a curved upper face thereto, a splayed and rounded forward face for the roll neck, lugs integral with the bearing block, longitudinal groove provision for retaining lubricant for the axle neck longitudinally and lateral groove provision at each side of the block for supplying lubricant laterally, fitting faces on the bearing block and rear fences on the block to limit backward travel of lubricant as set forth.

In testimony whereof I have signed my name to this specification.

DAVID JONES.